United States Patent
Hoshii et al.

(10) Patent No.: US 8,363,276 B2
(45) Date of Patent: Jan. 29, 2013

(54) PRINTER AND PRINTING METHOD ON THE BASIS OF CALIBRATION OF PRIMARY COLORS MIXTURE

(75) Inventors: Jun Hoshii, Nagano (JP); Ayako Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 103 days.

(21) Appl. No.: 13/045,942

(22) Filed: Mar. 11, 2011

(65) Prior Publication Data
US 2011/0279833 A1 Nov. 17, 2011

(30) Foreign Application Priority Data
May 17, 2010 (JP) ................................. 2010-113064

(51) Int. Cl.
*H04N 1/60* (2006.01)

(52) U.S. Cl. .......... 358/1.9; 358/2.1; 358/3.23; 358/504

(58) Field of Classification Search ........... 358/1.1–3.29
See application file for complete search history.

(56) References Cited

U.S. PATENT DOCUMENTS

| 2009/0080009 A1* | 3/2009 | Takahashi et al. ............. 358/1.9 |
| 2009/0213392 A1* | 8/2009 | Hoshii et al. .................. 358/1.9 |
| 2010/0014107 A1 | 1/2010 | Hoshii et al. |

FOREIGN PATENT DOCUMENTS
JP 2010-045771 A 2/2010

* cited by examiner

*Primary Examiner* — Benny Q Tieu
*Assistant Examiner* — Marcellus Augustin
(74) *Attorney, Agent, or Firm* — Global IP Counselors, LLP

(57) ABSTRACT

A printer performs calibration in which a reference primary color ink is mixed with at least one additional primary color ink to approximate a predetermined target primary color. The printer includes an acquisition section, a predicting section, an optimizing section and a printing unit. The acquisition section acquires spectral reflectances of the reference primary color ink printed on a base, the additional primary color ink printed on the base, and the base. The predicting section calculates predicted spectral reflectance of a mixture of the primary color inks by dividing a product of the spectral reflectances of the primary color inks by the spectral reflectance of the base raised to the power obtained by subtracting 1 from a total number of the inks. The optimizing section optimizes an ink-amount set of the mixture so that the predicted spectral reflectance is approximated to spectral reflectance of the target primary color.

4 Claims, 10 Drawing Sheets

| INDEX | PAINT NUMBER | INK-AMOUNT SET Φ | SPECTRAL REFLECTANCE (TARGET SPECTRAL REFLECTANCE) | | | | |
|---|---|---|---|---|---|---|---|
| | | | λ=300 | 310 | 320 | 330 | ... |
| 0000 | ◎××◎ | (255, 14, 0, 0) | 0 | 0 | 0 | 0 | |
| 0001 | ×◎◎× | (200, 10, 5, 0) | 0 | 0.05 | 0.05 | 0.05 | |
| 0002 | ◎●×◎ | (100, 10, 0, 0) | ● | ● | ● | ● | ... |
| 0003 | ●×●× | ● | ● | ● | ● | ● | ... |
| ● | ● | ● | ● | ● | ● | ● | ... |

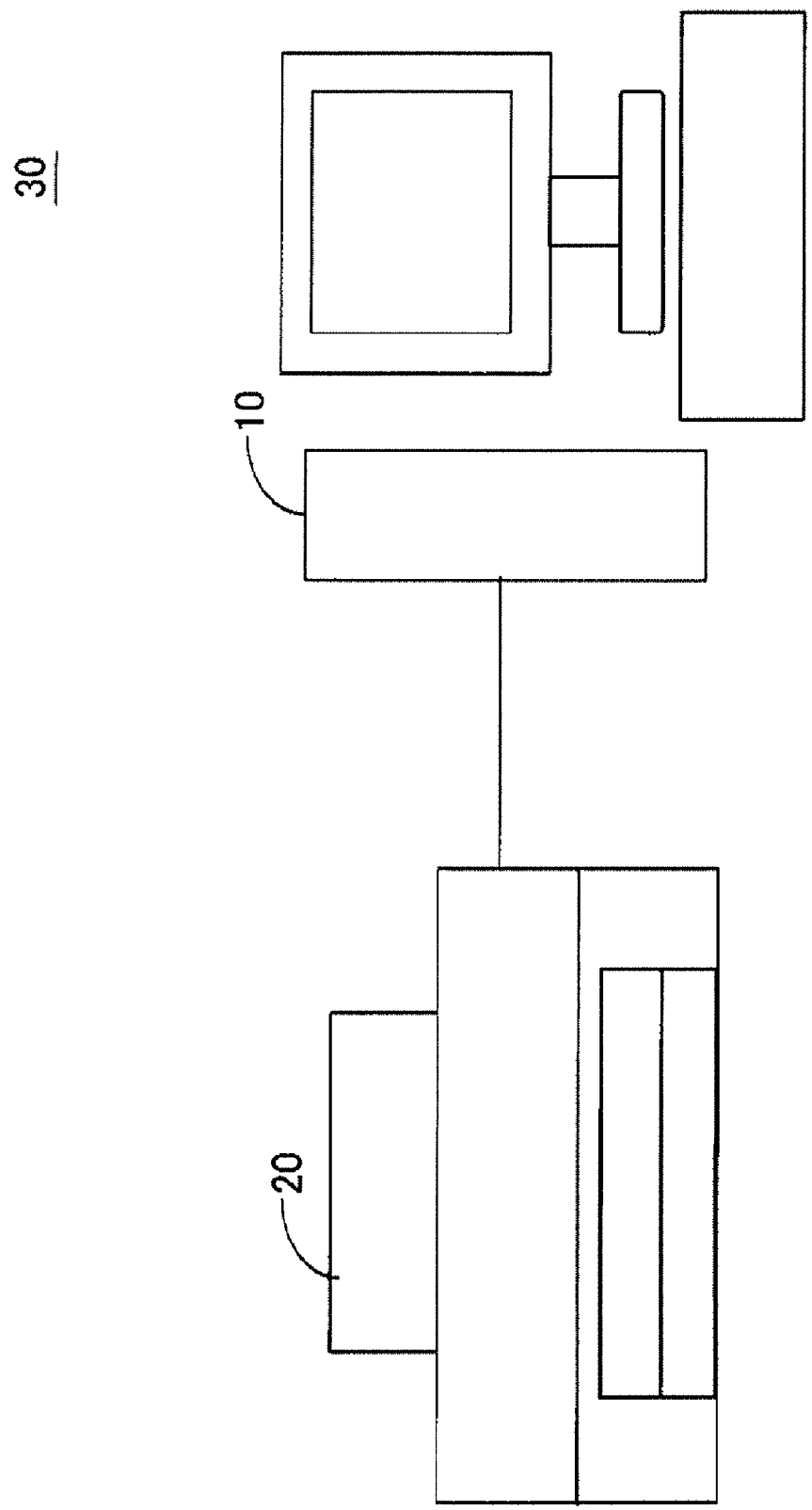

| INDEX | PAINT NUMBER | INK-AMOUNT SET Φ | SPECTRAL REFLECTANCE (TARGET SPECTRAL REFLECTANCE) | | | | |
|---|---|---|---|---|---|---|---|
| | | | λ=300 | 310 | 320 | 330 | ... |
| 0000 | ◎××◎ | (255, 14, 0, 0) | 0 | 0 | 0 | 0 | |
| 0001 | ×◎◎× | (200, 10, 5, 0) | 0 | 0.05 | 0.05 | 0.05 | |
| 0002 | ◎●×◎ | (100, 10, 0, 0) | • | • | • | • | ... |
| 0003 | ●×●× | • | • | • | • | • | ... |
| • | • | • | • | • | • | • | ... |

Fig. 7

PRINTER AND PRINTING METHOD ON THE BASIS OF CALIBRATION OF PRIMARY COLORS MIXTURE

CROSS-REFERENCE TO RELATED APPLICATIONS

This application claims priority to Japanese Patent Application No. 2010-113064 filed on May 17, 2010. The entire disclosure of Japanese Patent Application No. 2010-113064 is hereby incorporated herein by reference.

BACKGROUND

1. Technical Field

The present invention relates to a printer and a printing method. More specifically, the present invention relates to a device and a method for predicting the spectral reflectance of ink after color mixing.

2. Related Art

Conventionally, calibration is carried out in order to bring a primary color ink closer to a target primary color. With such calibration, the ink-amount set of a primary color ink is progressively changed so that the difference in spectral reflectance is reduced using the spectral reflectance of a primary color ink and the spectral reflectance of a target primary color (e.g., see Japanese Laid-Open Patent Application No. 2010-45771).

SUMMARY

In the calibration described above, the cost of measuring the spectral reflectance of all ink-amount sets is high in terms of time and human labor; therefore, the spectral reflectance of an ink-amount set is calculated using a prediction model from the spectral reflectance in representative ink-amount sets. However, in a conventional prediction model, the spectral reflectance is exhaustively predicted over the entire color gamut, and a large number of colorimetric points are prepared in advance. Accordingly, the conventional prediction model described above is difficult to use in color prediction in a relatively minimal color gamut such as in approximating a single primary color ink to a target primary color.

The present invention was developed in view of the foregoing problem, and an object thereof is to provide a spectral reflectance prediction method used for color prediction in a minimal color gamut, a spectral reflectance prediction device, a calibration method that uses the spectral reflectance prediction method, a calibration device, a printer and a printing method.

In order to solve the problems described above, a printer according to one aspect of the present invention is a printer for printing based on calibration results in which a reference primary color ink is mixed with at least one additional primary color ink different from the reference primary color ink to approximate a predetermined target primary color. The printer includes an acquisition section, a predicting section, an optimizing section and a printing unit. The acquisition section is configured to acquire spectral reflectance of the reference primary color ink printed on a base, spectral reflectance of the additional primary color ink printed on the base, and spectral reflectance of the base. The predicting section is configured to calculate predicted spectral reflectance of a mixture of the reference primary color ink and the additional primary color ink by dividing a product of the spectral reflectance of the reference primary color ink and the spectral reflectance of the additional primary color ink acquired by the acquisition section by the spectral reflectance of the base raised to the power of a value obtained by subtracting 1 from a total number of the reference primary color ink and the additional primary color ink mixed together. The optimizing section is configured to optimize an ink-amount set defining mixed amounts of the reference primary color ink and the additional primary color ink so that the predicted spectral reflectance of the mixture is approximated to spectral reflectance of the target primary color. The printing unit is configured to print in accordance with the ink-amount set optimized by the optimizing section.

Accordingly, in calibration used in applications in which color matching is limited such as color matching between printers, for example, the spectral reflectance after color mixing can be predicted from the spectral reflectance obtained by printing a reference primary ink and a base color of another primary color ink, and the spectral reflectance can be predicted in a simple manner. Also, according to the printer of the above aspect, calibration is performed using the predicted spectral reflectance, whereby the calibration can be carried out in a simple manner.

In the printer as described above, the predicting section is preferably configured to discretely calculate the predicted spectral reflectance for each of a plurality of mixtures of the reference primary color ink and the additional primary color ink, and the optimizing section is preferably configured to discretely obtain a plurality of optimized ink-amount sets for the mixtures using the predicted spectral reflectance, and to subsequently obtain an interpolated spectral reflectance by interpolating spectral reflectance corresponding to the optimized ink-amount sets to obtain an optimized ink-amount set for an additional mixture of the reference primary color ink and the additional primary color ink.

According to the invention of the above aspect, the number of colorimetric points of the primary color ink can be reduced and the time required for calibration can be shortened because the discretely predicted spectral reflectance is interpolated, and the mixed ink is optimized so as to approximate a target primary color, In the printer as described above, the optimizing section is preferably configured to vary a mixture ratio between the reference primary color ink and the additional primary color ink to optimize the ink-amount set.

The spectral reflectance prediction according to the present invention may be applied to a calibration device as well as to a calibration method that uses this spectral reflectance prediction.

BRIEF DESCRIPTION OF THE DRAWINGS

Referring now to the attached drawings which form a part of this original disclosure:

FIG. 2 is a simplified view illustrating the configuration of the calibration device 30;

FIG. 7 is a diagram representing an example of an index table IDT;

DETAILED DESCRIPTION OF EXEMPLARY EMBODIMENTS

Embodiments of the present invention will be described below in the following sequence: 1. Color prediction model; 2. Calibration method; and 3. Other embodiments.

1. Color Prediction Model

Figure 1A:
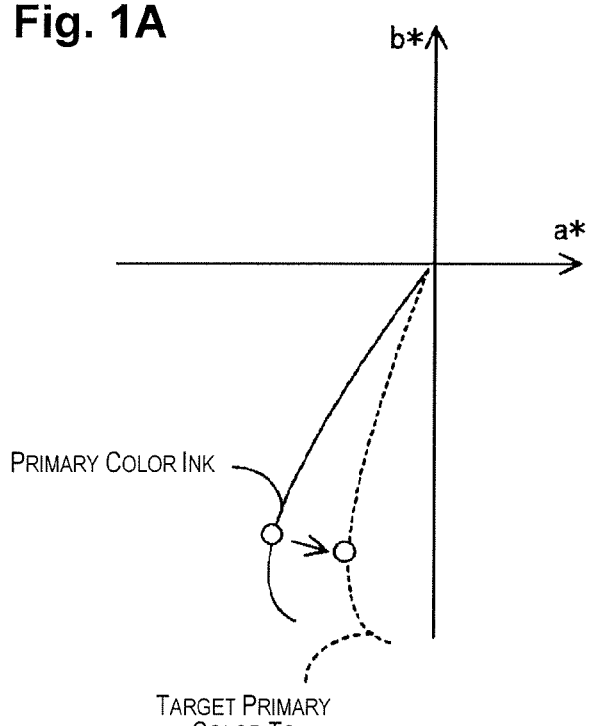
FIGS. 1A and 1B are diagrams describing the calibration according to the present embodiment.
Figure 1B:
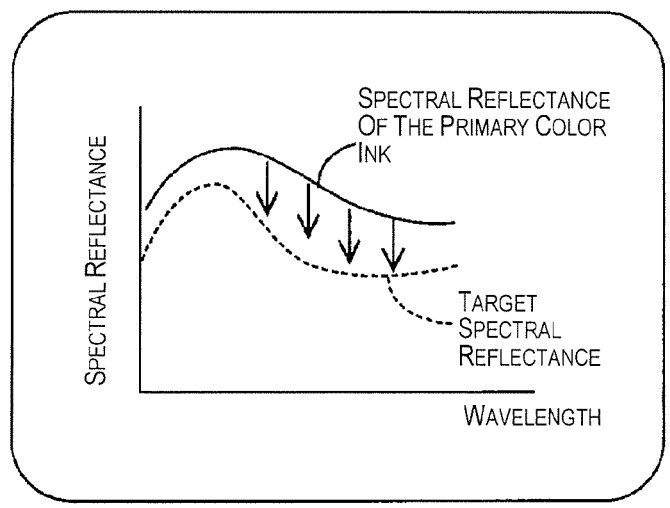

FIG. 1 is a diagram describing the calibration according to the present embodiment. In the calibration of the present embodiment, a small amount of another primary color ink (additional primary color ink) is mixed and color-matched so as to bring the spectral reflectance of an arbitrary primary color ink (reference primary color ink) close to the spectral reflectance of an established target primary color. Accordingly, the spectral reflectance of a target primary color and the predicted spectral reflectance of the mixed ink (mixture) in which a small amount of an additional primary color ink has been mixed with a reference primary color ink are acquired, and optimization (1–B) is carried out so as to reduce the difference between the predicted spectral reflectance of the mixed ink and the spectral reflectance Rt(λ) of the target primary color.

For example, in the case that cyan as the reference primary color ink is to be approximated to a target primary color Tc, the color difference between cyan ink and the target primary color Tc is offset in the hue direction, and the value of the cyan ink on the a*b* plane must be moved in the hue direction. In this case, in the optimization processing, the spectral reflectance of mixed ink obtained by mixing a small amount of another primary color ink (e.g., M (magenta)) with the cyan ink is calculated and the mixed color ratio of the cyan ink and the other ink is varied so that the difference from the spectral reflectance of the target primary color Tc is reduced.

If all spectral reflectances in a mixed ink must be measured when optimization is carried out, measuring the spectral reflectance of all mixed inks in the optimization process is impractical because the cost is high in terms of time and human labor. Accordingly, in the present embodiment, the spectral reflectance of the mixed ink is predicted using a color prediction model.

In the present embodiment, the spectral reflectance of the mixed ink is predicted based on the color prediction model expressed in the following formula (1).

Formula (1)

$$R_s(\lambda) = \sum_{\lambda=380}^{730} \left[ \left( \prod_{m=0}^{n} (R_m(\lambda)) \right) / R_{pw}^{n-1} \right] \quad (1)$$

In the formula, Rs(λ) is the predicted spectral reflectance. Rm(λ) is the spectral reflectance of an arbitrary primary color ink, where m is a value for identifying the primary color ink. For example, R1(λ), R2(λ), R3(λ), and R4(λ) are the spectral reflectances of cyan, magenta, yellow, and black, respectively. Rpw(λ) is the spectral reflectance of the base color of a base on which the inks are printed, and n is the number of the primary color inks mixed together.

Accordingly, the spectral reflectance of the mixed ink obtained by mixed a small amount of magenta ink with cyan ink can be calculated from the following formula (2), which is obtained from the formula (1).

Formula (2)

$$R_s(\lambda) = \sum_{\lambda=380}^{730} [(R_1(\lambda) \times R_2(\lambda))/R_{pw}] \quad (2)$$

With the color prediction model expressed in the formula (1), the predicted spectral reflectance Rs(λ) of the mixed ink can be very readily calculated based on the colorimetric value of the spectral reflectance of the primary color inks to be mixed. In calibration used in limited applications such as color matching between different printers, the spectral reflectance after color mixing can be predicted by simple computation by using the above-noted formula (1) because the number of other primary color inks to be mixed is limited as a matter of course.

2. Calibration Method

One embodiment of a printer including a calibration device according to the present invention is described below with reference to the drawings.

FIG. 2 is a simplified view illustrating the configuration of a printer including a calibration device 30. The calibration device 30 is composed of a PC 10 and a printing unit 20 that are connected to each other, and calibration is carried out so that a primary color ink discharged by the printing unit 20 under the control of the PC 10 is approximated to a target primary color.

Figure 3:
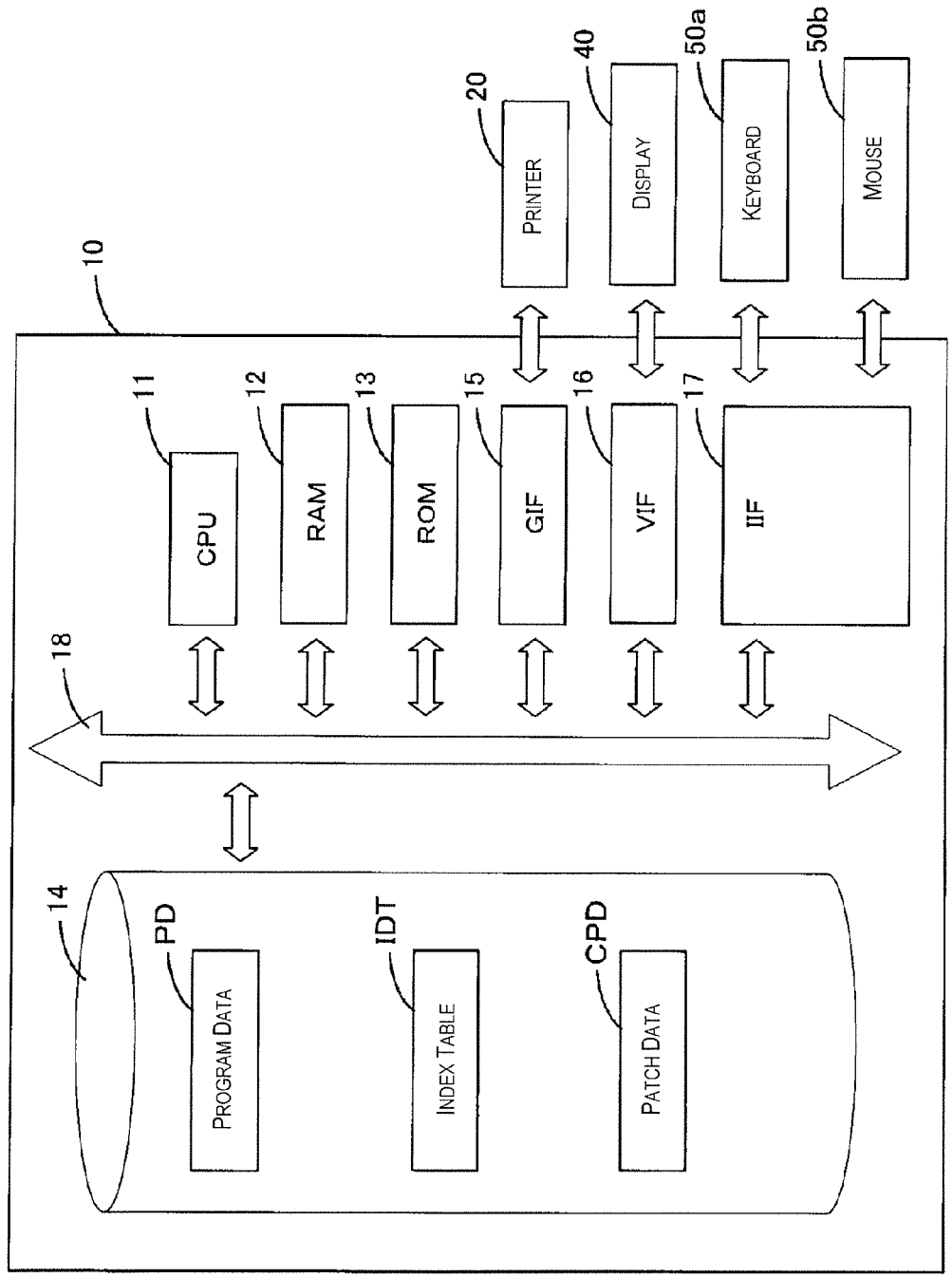
FIG. 3 is a schematic block diagram illustrating the configuration of the PC 10.

FIG. 3 is a schematic block diagram illustrating the configuration of the PC 10. The PC 10 is composed of a CPU 11, a RAM 12, a ROM 13, a HDD 14, various interfaces (GIF, VIF, IIF) 15 to 17, and a bus 18; and integral control is carried out by the CPU 11 via the bus 18.

The GIF (general interface) 15 is, e.g., a USB compliant interface that connects to the printing unit 20 and transmits data outputted from the PC 10 to the printing unit 20. The VIF (video interface) 16 is connected to a display 40 and displays images on the display 40. The IIF (input device interface) 17 is connected to a keyboard 50am and/or a mouse 50b and inputs operation input obtained by operation of a keyboard 50a and/or a mouse 50b to the PC 10.

In addition to program data PD, an index table IDT and patch data CPD are recorded in the HDD 14.

Figure 4:
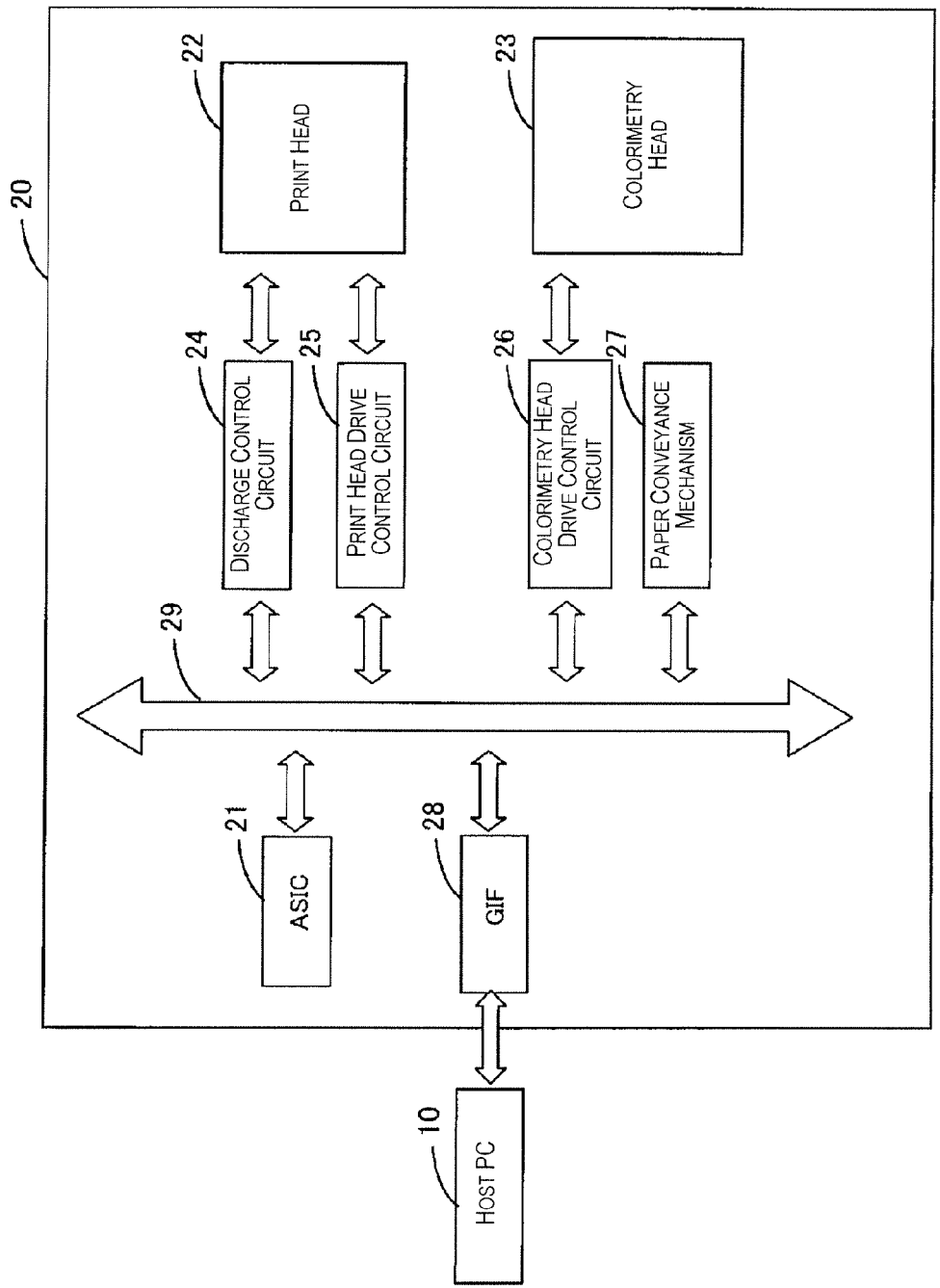
FIG. 4 is a schematic block diagram illustrating the configuration of the printing unit 20.

FIG. 4 is a schematic block diagram illustrating the configuration of the printing unit 20. The printing unit 20 is composed of an ASIC 21, a print head 22, a discharge control circuit 24, a print head drive control circuit 25, a paper conveyance mechanism 27, a GIF 28, and a bus 29; and carries out integral control using the ASIC 21. The printing unit 20 according to the present embodiment is composed of a colorimetry head 23 and colorimetry head drive control circuit 26, in addition to the configuration described above.

The print head 22 is a mechanism for moving in the main scanning direction in a reciprocating fashion under the control of the print head drive control circuit 25, and is controlled by the discharge control circuit 24 to mix and discharge primary color inks fed from ink cartridges (C, M, Y, K; not shown). The paper conveyance mechanism 27 is a mechanism for conveying printing paper in the sub-scanning direction. The GIF 28 connects the PC 10 and the GIF 15 and establishes communication with the PC 10.

The colorimetry head 23 performs colorimetry on a print image printed on paper (base) while moving in a reciprocating fashion in the main scan direction under the control of the colorimetry head drive control circuit 26. The colorimetry head 23 is provided with a photodetector (not shown) and detects the spectral reflectance $R(\lambda)$ of each color shown in the print image printed on the paper.

Figure 5:
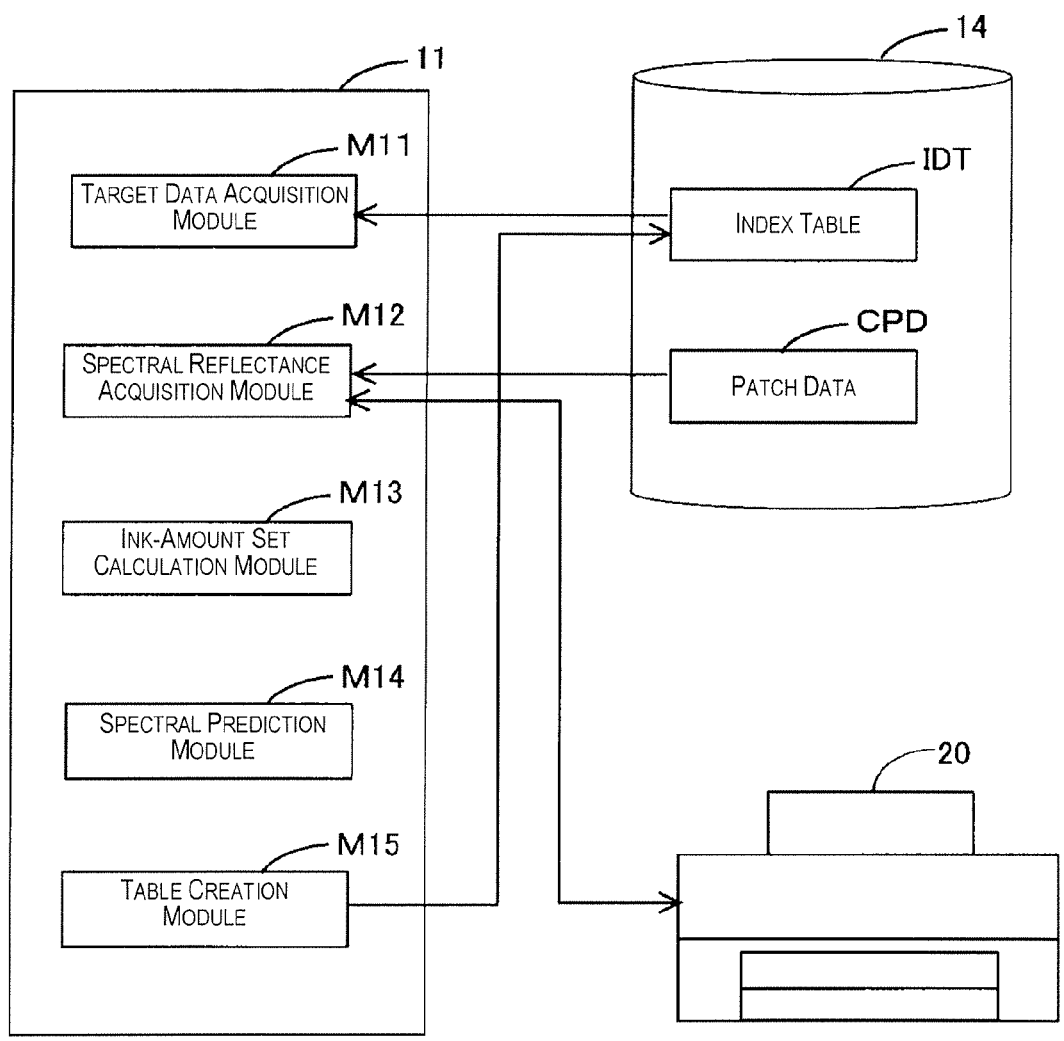
FIG. 5 is a function block diagram describing the functions of the CPU 11 when calibration is carried out.
Figure 6:
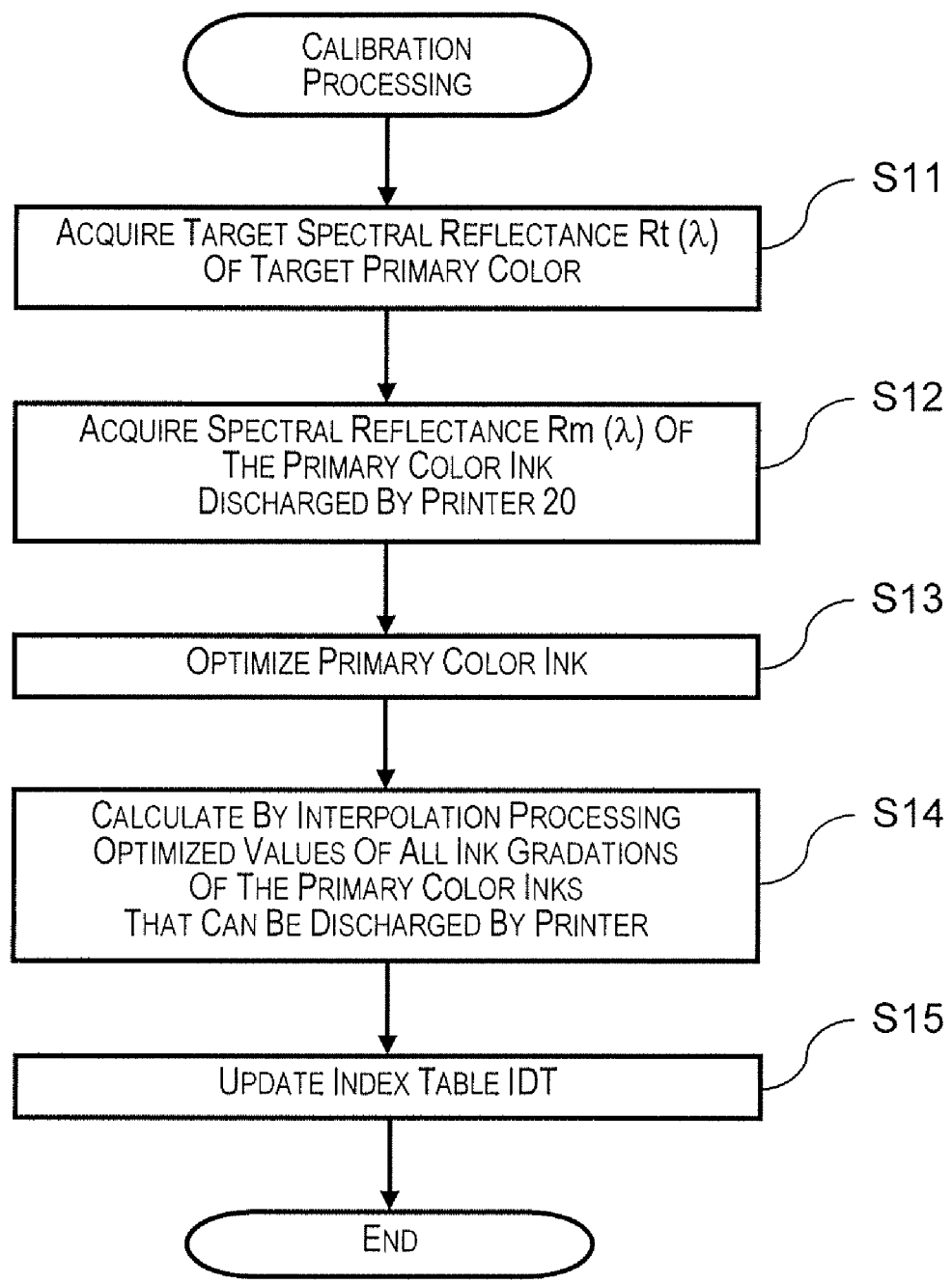
FIG. 6 is a flowchart describing the flow of calibration in the present embodiment.

FIG. 5 is a function block diagram describing the functions of the CPU 11 when calibration is carried out. FIG. 6 is a flowchart describing the flow of calibration in the present embodiment.

The CPU 11 executes a program data PD that implements functions of a target data acquisition module M11, a spectral reflectance acquisition module (acquisition section) M12, an ink-amount set calculation module (optimizing section) M13, a spectral prediction module (predicting section) M14, and a table creation module M15.

The target data acquisition module M11 acquires the target spectral reflectance $Rt(\lambda)$ as a reference of calibration in the printing unit 20. The target spectral reflectance $Rt(\lambda)$ is the spectral reflectance of a target primary color as a reference of calibration in the printing unit 20, and is, e.g., the spectral reflectance of the primary color ink to be discharged by the printer as a reference for color matching. The target spectral reflectance $Rt(\lambda)$ is recorded in the index table IDT for each primary color ink.

FIG. 7 is a diagram showing an index table IDT an example. The index table IDT correlates and records the index number that indicates the target primary color, the target spectral reflectance $Rt(\lambda)$ that corresponds to the target primary color, and the ink-amount set $\Phi$ that can be discharged by the printing unit 20 in order to reproduce the target primary color. The target primary color does not correspond to the ink-amount set $\Phi$ that corresponds to all ink-amount gradations, and only reference values are recorded.

The spectral reflectance acquisition module M12 acquires the spectral reflectance $Rm(\lambda)$ of a primary color ink that can be discharged by the printing unit 20 as the calibration target. The spectral reflectance acquisition module M12 causes the printing unit 20 to print a colorimetric patch composed of primary color inks on paper used as a base, and causes the colorimetry head 23 to perform colorimetry for the spectral reflectance of the colorimetric patch printed on the paper. The colorimetric patch is printed by the printing unit 20 based on patch data CPD and a plurality of ink gradations is expressed and formed for each primary color ink (C, M, Y, K). Accordingly, the colorimetry head 23 performs colorimetry of the colorimetric patch printed on the paper, and can thereby obtain the spectral reflectance of discrete primary color inks. In the present embodiment, the colorimetric patch is composed of four colors because there are four primary color inks CMYK, but the number of colors in the colorimetric patch can be set in accordance with the number of primary color ink to be used by the printing unit 20.

The ink-amount set calculation module M13 calculates, based on a predicted spectral reflectance $Rs(\lambda)$ of the mixed ink as predicted by the spectral prediction module M14a (described further hereunder), a printing unit 20 ink-amount set $\Phi$ that can reproduce the target spectral reflectance $Rt(\lambda)$, and an ink-amount set $\Phi$ proximate to the resulting ink-amount set $\Phi$.

The spectral prediction module M14 calculates the predicted spectral reflectance $Rs(\lambda)$ of the mixed ink based on the color prediction model expressed in formula (1) noted above. When the predicted spectral reflectance $Rs(\lambda)$ is calculated, the spectral prediction module M14 references the spectral reflectances $Rm(\lambda)$ of the primary color inks acquired by the spectral reflectance acquisition module M12.

The table creation module M15 updates the index table IDT based on the ink-amount set ($\Phi$) calculated by the ink-amount set calculation module M13. In other words, when the ink-amount set calculation module M13 calculates the ink-amount set $\Phi$ for reproducing a target primary color, the table creation module M15 records this ink-amount set $\Phi$ in the column that corresponds to the index number of the target primary color recorded in the index table IDT.

Described below is the calibration processing of the primary color ink in the calibration device 30 according to the present embodiment.

In step S11, the target data acquisition module M11 references the index table IDT and acquires the target spectral reflectance $Rt(\lambda)$ of the primary color ink.

In step S12, the spectral reflectance acquisition module M12 acquires the spectral reflectances $Rm(\lambda)$ of the primary color inks discharged from the printing unit 20 onto the paper as the target of calibration. In other words, the spectral reflectance acquisition module M12 causes the printing unit 20 to print a colorimetric patch based on the patch data CPD on the paper. The spectral reflectance acquisition module M12 controls the colorimetry head drive control circuit 26 and causes the colorimetry head 23 to perform colorimetry for the spectral reflectance of each patch. The spectral reflectance thus determined is furthermore transmitted to the PC 10 and recorded as the spectral reflectance $Rm(\lambda)$. Also, the spectral reflectance of the paper (as a base) is measured by the colorimetry head 23, and the spectral reflectance of the paper is transmitted to the PC and recorded as the spectral reflectance $Rpw(\lambda)$.

In step S13, the primary color inks are optimized by the ink-amount set calculation module M13 and the spectral prediction module M14. In the optimization processing, another primary color ink is mixed with the reference primary color ink so that the mixed ink approximates the target primary color ink (target spectral reflectance $Rt(\lambda)$) and an optimal ink-amount set is calculated.

Figure 8:
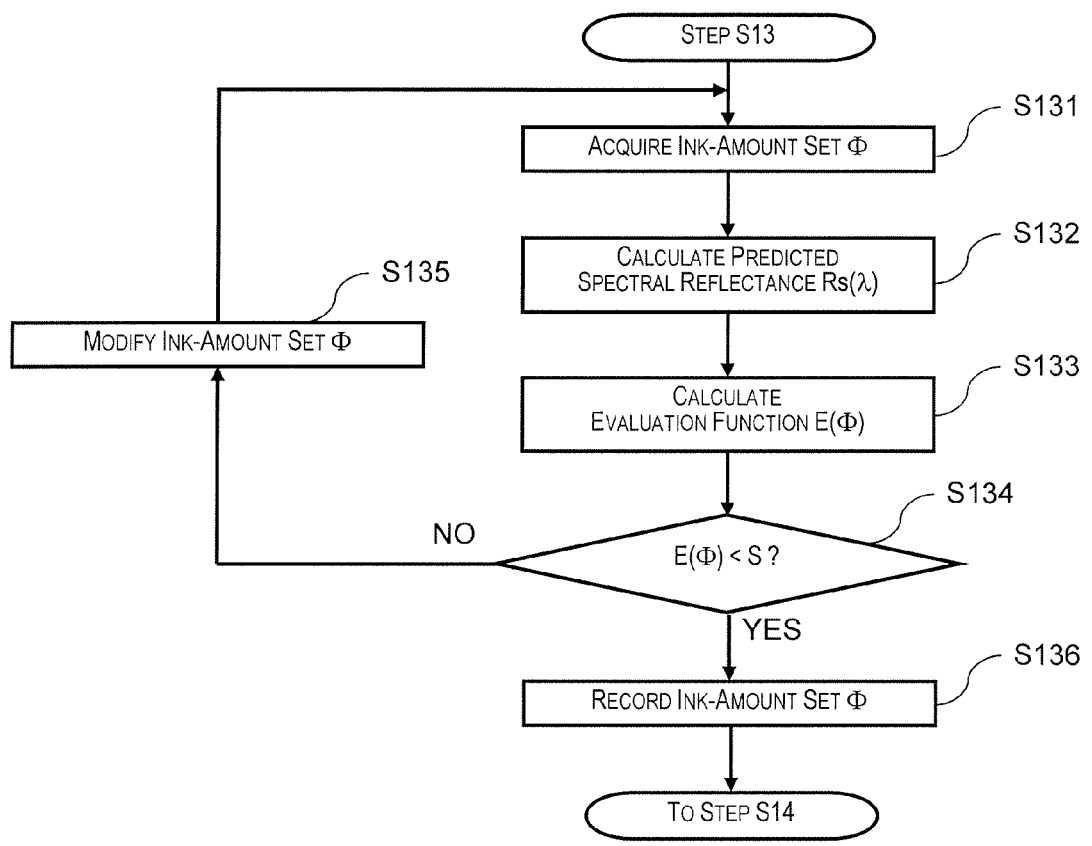
FIG. 8 is a flowchart for providing a detailed description of the processing carried out in step S13 of FIG. 6.

FIG. 8 is a flowchart for providing a detailed description of the processing carried out in step S13. In step S131, the ink-amount set calculation module M13 acquires as an initial value the ink-amount set $\Phi$ composed of the primary color ink as the calibration target and a small amount of the primary color ink to be mixed with the calibration-target primary color ink. The initial value of the ink-amount set ($\Phi$) acquired in step S131 is a value obtained by experimentation or the like.

In step S132, the ink-amount set calculation module M13 specifies to the spectral prediction module M14 the ink-amount set $\Phi$ acquired in step S131, and causes the predicted spectral reflectance $Rs(\lambda)$ of the specified ink-amount set to be calculated. Accordingly, the spectral prediction module M14 acquires the spectral reflectance $Rm(\lambda)$ of each of the inks constituting the specified ink-amount set $\Phi$ corresponding to the amount of each of the inks in the specified ink-amount set $\Phi$, and calculates the predicted spectral reflectance $Rs(\lambda)$ of the ink-amount set $\Phi$ by substituting the value into the formula (1).

Figure 9A:
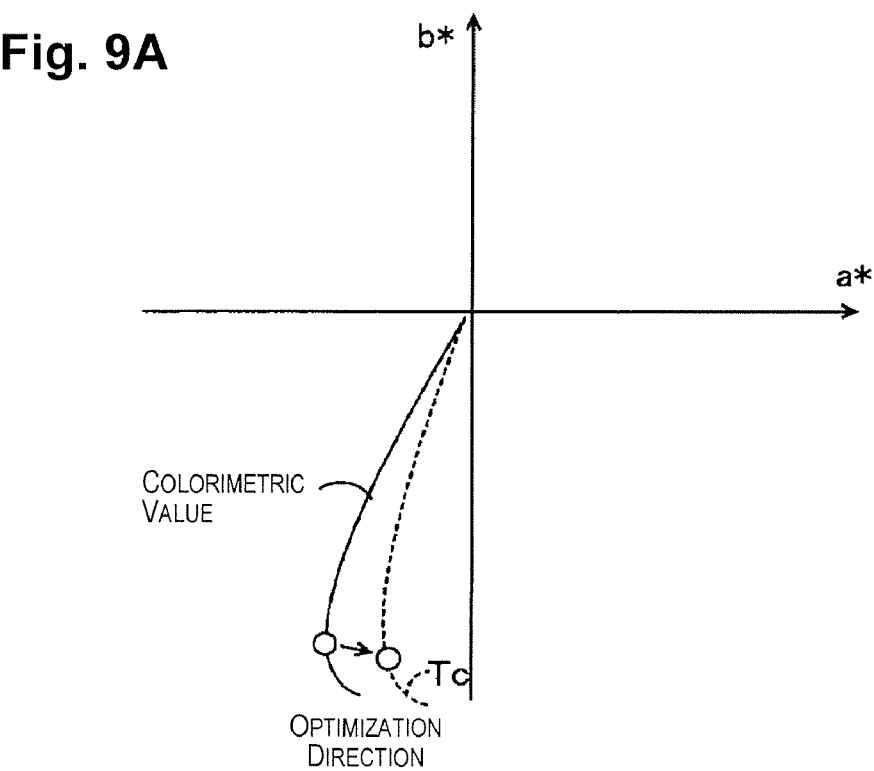
FIGS. 9A and 9B are diagrams for describing the relationship between a primary color ink and a target primary color.
Figure 9B:
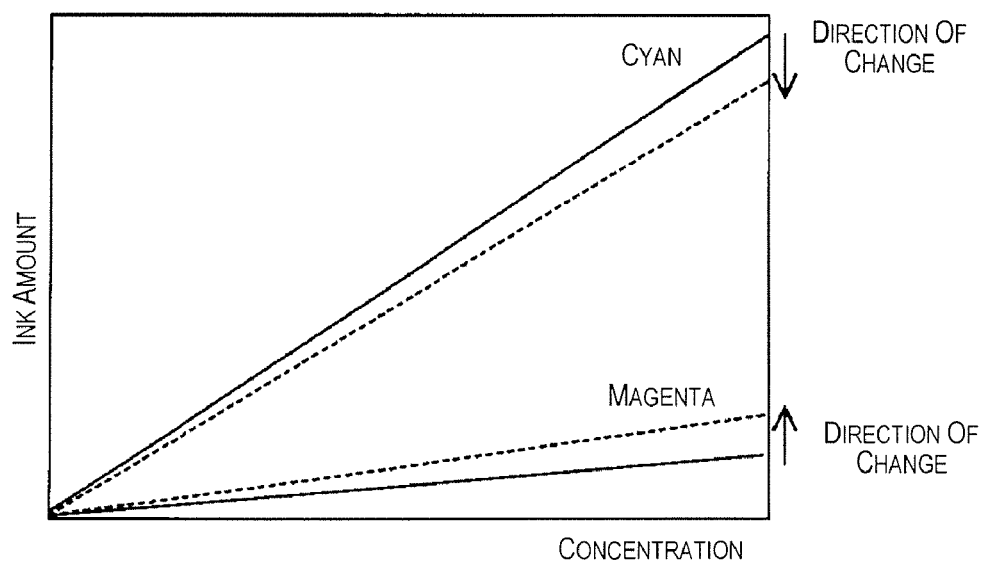

FIGS. 9A and 9B are diagrams for describing the relationship between a primary color ink and a target primary color. FIG. 9A shows the relationship between the primary color inks in the a*b* plane. FIG. 9B shows the mixed color ratio of the reference primary color ink and the other primary color ink to be mixed.

In step S133, the ink-amount set calculation module M13 calculates the target spectral reflectance Rt(λ) and the difference D(λ) from the spectral reflectance Rm(λ) of the mixed ink predicted in step S132 for each wavelength λ (e.g., 380 nm to 730 nm), and multiplies a weighted coefficient w(λ), which is weighted for each wavelength λ, by the difference D(λ). The square root of the root mean square of this value is calculated as the evaluation function E(Φ).

In other words, the evaluation value E(Φ) can be expressed by formula (3) shown below.

Formula (3)

$$E(\phi) = \sqrt{\frac{\sum \{w(\lambda)D(\lambda)\}^2}{N}} \quad (3)$$

$$D(\lambda) = R_t(\lambda) - R_s(\lambda)$$

In the expression, N is the number of segments of the wavelength λ. In (3) above, the difference between the target spectral reflectance Rt(λ) and the predicted spectral reflectance Rs(λ) in each wavelength λ is reduced as the evaluation value E(Φ) is reduced.

Formula (4) noted below is used as the weighted coefficient w(λ).

Formula (4)

$$w(\lambda) = x(\lambda) + y(\lambda) + z(\lambda) \quad (4)$$

In formula (4), the weighted coefficient w(λ) is defined by adding color-matching functions x(λ), y(λ), and z(λ). The color-matching functions x(λ), y(λ), and z(λ) have a spectrum that corresponds to human visual sensitivity, and greater weight can be given to the spectral reflectance R(λ) in a wavelength range to which human visual sensitivity is attuned. For example, in the near ultraviolet wavelength range which cannot be perceived by the human eye, w(λ)=0, and the difference D(λ) in the wavelengths does not contribute to an increase in the evaluation value E(Φ).

In step S134, the ink-amount set calculation module M13 varies the ink-amount set Φ (step S135) and repeats the processing of steps S131 to S134 in the case that the thus-formed evaluation function E(Φ) is at the threshold S or higher (step S134: NO). Here, variation in the ink-amount set Φ refers to variation only in the mixed color ratio so that the total ink amount of the changed ink-amount set does not vary. In other words, in the case that the ink amount of a magenta ink mixed with a cyan ink is increased, the ink-amount set Φ is set so that the ink amount of the cyan ink is reduced by an equivalent amount, as shown in FIG. 9-B. The threshold S is an empirically determined value.

In the case that the thus-created evaluation function E(Φ) is less than the threshold S (step S134: YES), the ink-amount set calculation module M13 determines and records (step S136) the ink-amount set Φ to be the optimized ink-amount set.

In step S14 in FIG. 6, the ink-amount set calculation module M13 interpolates an optimized discrete ink-amount set Φ and calculates the optimized ink-amount set Φ in relation to all ink gradations of the primary color inks that can be discharged by the printing unit 20.

Figure 10:
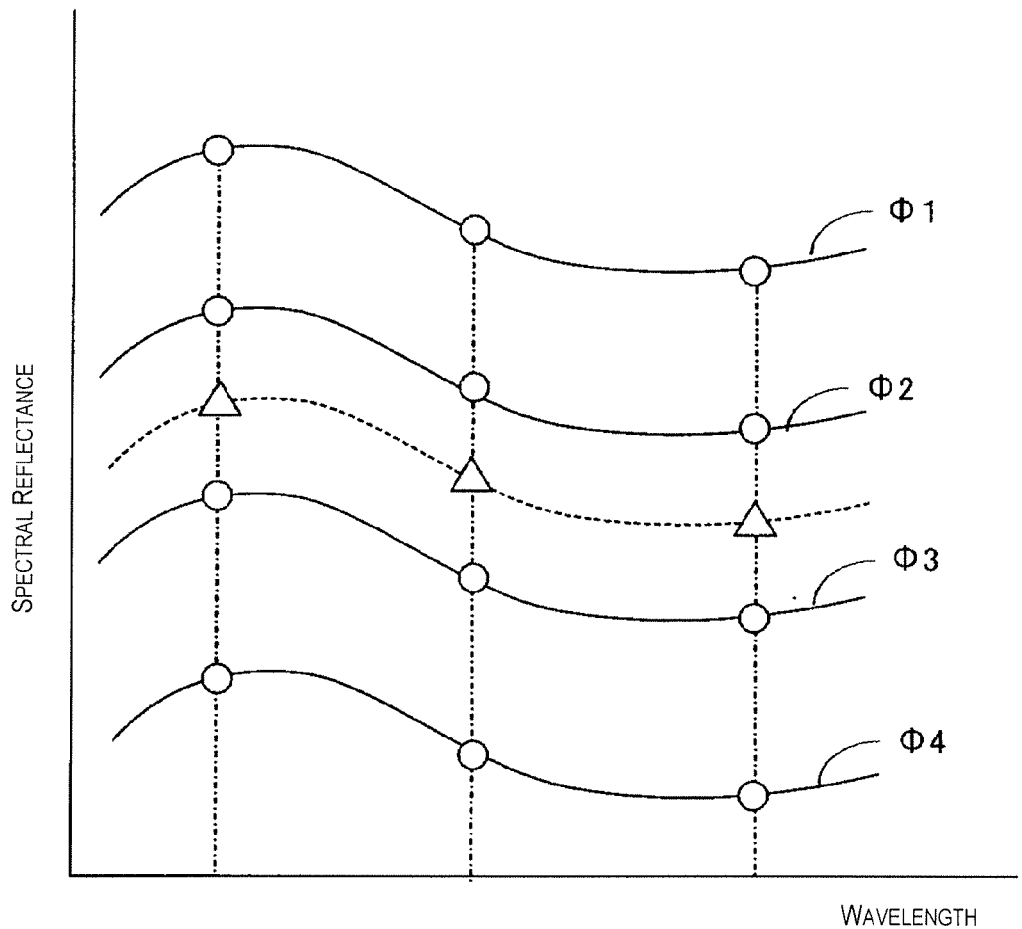
FIG. 10 is a diagram for describing the interpolation process carried out in step S14 of FIG. 6.

FIG. 10 is a diagram for describing the interpolation process carried out in step S14. The ink-amount sets Φ1 to Φ4 are examples of the ink-amount set Φ calculated in step S13. The ink-amount set Φ acquired in step S13 is a value discretely acquired in accordance with the target primary color or the number of colorimetric points of the colorimetric patch, and is not a value calculated for all of the primary color inks discharged by the printing unit 20. Accordingly, the ink-amount sets Φ not calculated in step S13 must be calculated.

In step S14, the ink-amount set calculation module M13 interpolates the spectral reflectance Rs(λ) for each predetermined wavelength, and calculates the predicted spectral reflectance Rs'(λ) at each wavelength. The predicted spectral reflectances Rs'(λ) of the wavelengths are tied together and the predicted spectral reflectances Rs'(λ) are calculated in predetermined wavelength ranges. The ink-amount set calculation module M13 acquires the ink-amount set Φ that corresponds to predicted spectral reflectance Rs'(λ) thus calculated. Here, the method for acquiring the corresponding ink-amount set Φ from the predicted spectral reflectance Rs'(λ) at a calculated predetermined wavelength may be the same method using FIG. 8, in which the predicted spectral reflectance Rs'(λ) acquired by interpolation is viewed as the target spectral reflectance Rt(λ). The interpolation processing may be B-spline interpolation or another known interpolation process.

In step S15, the table creation module M15 records all of the calculated ink-amount sets Φ in the index table IDT as optimized ink-amount sets Φ. Accordingly, the printing unit 20 thereafter discharges ink based on the ink-amount sets Φ recorded in the index table IDT when a primary color ink is to be discharged.

3. Other Embodiments

A variety of embodiments exist for the present invention. According to one embodiment given by way of example, the calibration device 30 is composed of a PC 10 and a printing unit 20; however, it is also possible to provide the printing unit 20 with the functions of the PC 10 and to perform calibrations in accordance with the present embodiment using a stand-alone printer.

The four primary color inks CMYK are an example, and no limitation is imposed thereby.

As shall be apparent, the present invention is not limited to the examples described above. Specifically, there are disclosed, as examples of the present invention, the suitable use of members, configurations, and the like (or modified combinations of such members, configurations, and the like) interchangeable with those disclosed in the examples above; the suitable substitution of members, configurations, and the like (or modified combinations of such members, configurations, and the like) that have not been disclosed in the examples above but that are interchangeable with prior art members, configurations, and the like disclosed in the examples above; and suitable substitution of members, configurations, and the like (or modified combinations of such members, configurations, and the like) that have not been disclosed in the examples above but that could be envisioned by one skilled in the art, based on the prior art or the like, as a substitute member, configuration, or the like.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion,"

"member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printer for printing based on calibration results in which a reference primary color ink is mixed with at least one additional primary color ink different from the reference primary color ink to approximate a predetermined target primary color, the printer comprising:
    an acquisition section configured to acquire spectral reflectance of the reference primary color ink printed on a base, spectral reflectance of the additional primary color ink printed on the base, and spectral reflectance of the base;
    a predicting section configured to calculate predicted spectral reflectance of a mixture of the reference primary color ink and the additional primary color ink by dividing a product of the spectral reflectance of the reference primary color ink and the spectral reflectance of the additional primary color ink acquired by the acquisition section by the spectral reflectance of the base raised to the power of a value obtained by subtracting 1 from a total number of the reference primary color ink and the additional primary color ink mixed together;
    an optimizing section configured to optimize an ink-amount set defining mixed amounts of the reference primary color ink and the additional primary color ink so that the predicted spectral reflectance of the mixture is approximated to spectral reflectance of the target primary color; and
    a printing unit configured to print in accordance with the ink-amount set optimized by the optimizing section.

2. The printer according to claim 1, wherein
    the predicting section is configured to discretely calculate the predicted spectral reflectance for each of a plurality of mixtures of the reference primary color ink and the additional primary color ink, and
    the optimizing section is configured to discretely obtain a plurality of optimized ink-amount sets for the mixtures using the predicted spectral reflectance, and to subsequently obtain an interpolated spectral reflectance by interpolating spectral reflectance corresponding to the optimized ink-amount sets to obtain an optimized ink-amount set for an additional mixture of the reference primary color ink and the additional primary color ink.

3. The printer according to claim 1, wherein
    the optimizing section is configured to vary a mixture ratio between the reference primary color ink and the additional primary color ink to optimize the ink-amount set.

4. A printing method for printing based on calibration results in which a reference primary color ink is mixed with at least one additional primary color ink different from the reference primary color ink to approximate a predetermined target primary color, the printing method comprising:
    acquiring spectral reflectance of the reference primary color ink printed on a base, spectral reflectance of the additional primary color ink printed on the base, and spectral reflectance of the base;
    calculating predicted spectral reflectance of a mixture of the reference primary color ink and the additional primary color ink by dividing a product of the spectral reflectance of the reference primary color ink and the spectral reflectance of the additional primary color ink by the spectral reflectance of the base raised to the power of a value obtained by subtracting 1 from a total number of the reference primary color ink and the additional primary color ink mixed together;
    optimizing an ink-amount set defining mixed amounts of the reference primary color ink and the additional primary color ink so that the predicted spectral reflectance of the mixture is approximated to spectral reflectance of the target primary color; and
    printing in accordance with the ink-amount set that has been optimized.

* * * * *